United States Patent [19]
Winterowd et al.

[11] Patent Number: 5,944,938
[45] Date of Patent: Aug. 31, 1999

[54] WOOD BONDING METHOD

[75] Inventors: Jack G. Winterowd, Puyallup; Gerald N. MacPherson, Woodland, both of Wash.

[73] Assignee: Weyerhaeuser Company, Tacoma, Wash.

[21] Appl. No.: 08/767,749

[22] Filed: Dec. 17, 1996

Related U.S. Application Data

[63] Continuation-in-part of application No. 08/474,596, Jun. 7, 1995, abandoned.

[51] Int. Cl.$^6$ .................................................. C09J 5/04
[52] U.S. Cl. ..................... 156/315; 144/352; 428/525; 428/529; 525/501; 525/503; 528/146
[58] Field of Search ............................. 156/315; 428/525, 428/529; 144/352; 525/501, 504; 528/146

[56] References Cited

U.S. PATENT DOCUMENTS

| | | |
|---|---|---|
| Re. 26,881 | 5/1970 | Kreibich et al. . |
| 2,385,372 | 9/1945 | Rhodes . |
| 2,414,414 | 1/1947 | Rhodes . |
| 2,495,175 | 1/1950 | Nagel . |
| 2,557,826 | 6/1951 | Keaton et al. . |
| 3,037,900 | 6/1962 | Hings et al. ............................. 156/315 |
| 3,054,703 | 9/1962 | Brasure .................................. 156/332 |
| 3,492,263 | 1/1970 | Kreibich et al. . |
| 3,706,619 | 12/1972 | Freeman .................................. 156/315 |
| 3,784,514 | 1/1974 | Tiedeman . |
| 3,784,515 | 1/1974 | Freeman et al. . |
| 3,786,025 | 1/1974 | Freeman et al. . |
| 3,802,986 | 4/1974 | Forsythe . |
| 4,061,620 | 12/1977 | Gillern . |

FOREIGN PATENT DOCUMENTS

| | | |
|---|---|---|
| 493010 | 7/1992 | European Pat. Off. . |
| 59-47275 | 3/1984 | Japan ................................ 156/315 |

*Primary Examiner*—John J. Gallagher

[57] ABSTRACT

The invention is a method of gluing wood using a reactive two component thermosetting adhesive such as a phenol-resorcinol-formaldehyde (PRF) condensation product. One component is first coated on one of the members to be bonded. The second component is then spread directly on top of the first in a manner to minimize mixing; e.g., by spraying. When the mating member to be bonded is placed against the adhesive coated first member and pressure is applied the components are mixed. This begins the curing reaction between the components so that a thermosetting adhesive bond is formed. With selected adhesives very rapid curing times are possible. A preferred adhesive has a first component comprising a PRF resin mixed with a methylene group donor hardener such as paraformaldehyde. The second part is also a PRF resin. No hardener is present in the second part. Instead an oxygen and nitrogen containing heterocycle is used as an accelerator. Morpholine is a preferred compound. Cure times as low as two minutes to a handleable product are possible. The method is particularly useful for the manufacture of laminated veneer lumber.

8 Claims, No Drawings

WOOD BONDING METHOD

This application is a continuation-in-part of application Ser. No. 08/474,596 filed Jun. 7, 1995, now abandoned.

The present invention is a novel method of application and use of a rapid curing adhesive composition. It is (especially well adapted) to joining wood products where (adhesive application is limited to only one of the two surfaces to be joined) and where rapid cure times are desirable but some open and closed assembly time tolerance is essential. When used with a most preferred adhesive the method is useful for gluing woods of higher moisture content than is normally acceptable for adhesive bonding.

BACKGROUND OF THE INVENTION

Thermosetting adhesives have been used for many years where durable weather resistant bonds are required. Most of these are based on phenol-formaldehyde condensation products or phenol-formaldehyde polymers further modified by addition of a dihydric aromatic compound such as resorcinol. Occasionally resorcinol-formaldehyde polymers have been used as adhesives but these are less common because of their high cost. (The phenol-resorcinol-formaldehyde, or PRF, adhesives have the advantage that they cure to infusible and insoluble thermoset polymers at room temperatures.) Other adhesives that will cure very rapidly at room temperature, such as those based on condensation products of formaldehyde and phenol with aromatic amine compounds; e.g. m-aminophenol, diaminonaphthalenes or hydroxyaminonaphthalenes, and conjugated nitrogen containing heterocycles such as pyrroles or diaminopyridines have not found commercial acceptance for a number of reasons. These include high cost and toxicity of some ingredients. Adhesives which are exemplary of these very rapid curing types are described in U.S. Pat. Nos. 3,784,515, 3,786,025, and 3,784,514 respectively.

The method of maling phenol-resorcinol-formaldehyde adhesive compositions is well known in the art. Typically, a phenol-formaldehyde resole is first formed. This may be condensed in the presence of an alkaline catalyst such as sodium hydroxide or sodium carbonate or with an ortho-directing catalysts such as calcium or zinc acetate. At some point after the initial condensation, resorcinol is added in an amount so that the ultimate ratio of formaldehyde to aromatic hydroxy compounds is less than unity, typically about 0.65 to 0.75. U.S. Pat. Nos. 2,385,372 and 2,414,414 are typical of processes making the alkaline condensed resins while U.S. Pat. Nos. 3,492,263 and 4,061,620 are directed to ortho-condensed phenol-resorcinol adhesive resins. These resins are mixed with a hardener at the time of use. Hardeners contain allylene group donors and most typically include fornalin, paraformaldehyde, or α-polyoxymethylene mixed in a powdered solid system or in liquid suspension with an inert filler Phenol-resorcinol-formaldehyde adhesives are readily available from several commercial sources. The commercial products are sold in a number of grades for different applications; e.g., finger jointing and laminating. All of these are basically similar although they may have minor differences in such properties as water dilutability, viscosity, resorcinol to phenol ratio, pot life after hardener addition, compatibility with solid or liquid hardener systems, etc. While there are PRF resins that are preferred for use with the present invention, many if not most of those presently on the market would be acceptable. PRF adhesive resins per se form no part of the present invention.

Environmental concerns affecting both public and private forest lands, and poor stewardship on many forest lands over the past century, have greatly reduced the available supply of timber for the manufacture of lumber and other forest products. In many cases it is now necessary to use lumber formed from smaller pieces glued together using finger or scarf joints and/or edge gluing or lamination simply because the large logs necessary to cut it in solid sawn form are not available. Unfortunately, gluing technology has not evolved at the same rate as the need for utilization of small and low grade logs.

One particular need of wood products manufacturers has been the development of a rapid curing PRF adhesive. There are many ways in which the ability to rapidly bond wood would be beneficial to forest products producers. Until a short time ago radio frequency heating was the only method for rapidly bonding wood with a PRF adhesive. This system failed to produce reliable bonds when moisture content of the wood was above about 16%. Recently one successful process suitable for rapidly bonding wetter wood has become available. This is described in European Patent Application 493,010. In this process a PRF resin with added hardener is allowed to advance somewhat to a rather high viscosity before it is placed on one of the members to be joined. A cure promoter chemical, selected from groups such as ammonia or amine derivatives, low molecular weight carboxylic acids, or Lewis acids, is placed on the opposite surface to be mated. Aqua ammonia of about 28–30% concentration appears to be a preferred cure promoter. The members are then clamped with sufficient pressure to cause mixing of the cure promoter and resin. Within several minutes the resulting joint has developed sufficient strength to be handled. Further cure until the ultimate joint strength is developed takes place over a matter of hours.

While the particular adhesive system just noted is new, (these so called "honeymoon" systems, in which reactive components are placed separately on opposite sides of a joint, have been known for many years.) The first disclosure to the present inventors knowledge in which a PRF honeymoon resin formulation was used is found in U.S. Pat. No. 2,557,826. U.S. Pat. No. 3,802,986 describes a PRF honeymoon system specifically adapted for finger jointing short pieces of lumber. In some honeymoon systems, such as the one noted in the above European patent application, the resin is placed on one side of the joint and the hardener or an accelerator of some sort on the other. In others, both components are adhesives in their own right and will cure to form bonds even if mixing is poor when the two sides are brought together. For many reasons, some valid and others not, honeymoon adhesives have never found wide acceptance. Despite certain problems such as emission of dangerous ammonia fumes, the ability of the process in the above noted European patent application to glue high moisture content woods may help to overcome this past reluctance to use honeymoon systems.

The present invention represents an improvement in the use of rapid curing resin systems in that it has the many benefits of a honeymoon system in achieving rapid cure times but has the particular advantage of requiring application of the adhesive to only one of the surfaces being bonded.

SUMMARY OF THE INVENTION

The present invention is directed to a method of using a rapid curing durable two component reactive resin adhesive composition for bonding wood. In particular, it is directed to a method of applying adhesives having the extremely rapid curing properties of honeymoon systems to only one of the faces being bonded when process or other limitations make it impractical or impossible to spread the respective reactive components on both of the faces. By "extremely rapid curing" is meant reactive two component adhesive systems that when mixed gel to an essentially unworkable state within five minutes or less. These adhesives if applied to wood surfaces after mixing would permit only the most limited open assembly time and would have essentially no closed assembly tolerance before pressure was applied to the joint. The present method provides the significant advantage of considerable open and closed assembly time.

When used with a preferred adhesive system the method has been found to be highly effective for achieving rapid cures and excellent bonds even with wood having higher moisture contents. The adhesive comprises a two component thermosetting resin system in which the components must ultimately be mixed together to induce rapid curing. While the preferred adhesive is based on phenol-resorcinol-formaldehyde condensation polymers, others types may be satisfactory as well; e.g., polymers of phenol-formaldehyde with various diamines or hydroxy amines. Many of the adhesives normally recommended for use in honeymoon systems are satisfactory for use with the present method.

By a "two component reactive resin adhesive system" is meant one in which either part may or may not be an adhesive in its own right but neither part used by itself will develop significant bond strength in less than about 30 minutes. However, when the two components are thoroughly mixed they begin to react almost immediately to form a bond of considerable strength within minutes. In some applications the most preferred types form handleable bonds in less than one minute. The bond strength will then continue to develop over a matter of hours until the ultimate strength is reached. When used with the most preferred types of adhesives at least about 15–25% of the ultimate bond strength will usually develop within the first minute. This is sufficient so that the joined members can be further processed almost immediately.

In the present method a first adhesive component is placed on one of the surfaces to be bonded. (Quite surprisingly it has been found that the second adhesive component may be placed directly on top of the first, rather than on the other surface, as long as this is done in a manner so that the components are only in interfacial contact and it is essential that no significant mixing occurs.) (The members to be joined are then brought together under sufficient pressure to cause mixing and subsequent rapid reaction of the two adhesive components.) While the method has some resemblance to known honeymoon systems, it is particularly advantageous in that the adhesive need be applied to only one of the surfaces being bonded rather than to each of them.

One preferred adhesive for use with the method can be formulated to develop sufficient strength for handling two or more members being bonded, usually with press times significantly less than ten minutes at room or slightly elevated temperatures. In addition, this adhesive permits laminates to be formed with a closed assembly time up to about 30 minutes before application of full pressure. This adhesive consists of two components or parts. The first is a (conventional) phenol-resorcinol-formaldehyde resin, such as a wood laminating adhesive, along with a (hardener) containing an )alkylene group donor such as formaldehyde, paraformaldehyde, or a-polyoxymethylene.) The second part is a similar or identical resin which does not use a conventional hardener but instead contains a modifier which is a heterocyclic nitrogen and oxygen containing compound of the formula

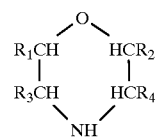

wherein any of $R_1$ to $R_4$ are hydrogen or $C_1$ or $C_2$ alkyl. The preferred modifier is morpholine in an amount of from 1–10 parts per 100 parts of resin by weight in the second part of the adhesive system..

A sufficient amount of the alkylene donor hardener is contained in the first part of the composition to effect a full thermosetting cure of both parts when they are ultimately combined. The nature of the reaction is not well understood. However, the morpholine appears to acts as a trigger or (accelerator) to promote a very rapid reaction when the two parts are mixed together.

In application of the present method, a sufficient amount of the first adhesive component is applied by any means to a surface of one of the members to be joined. (The second adhesive part is then applied directly over the first part in a manner that will minimize mixing; e.g., by spraying.) The other member of the joint is then assembled to the first in a manner that will not cause significant mixing of the two adhesive components. Pressure is then applied to the assembly. The two parts of the adhesive are mixed at that time and react to form the glue-bonded joint. While the adhesive just described will normally cure to a handleable bond in less than a minute at room temperature, elevated pressing temperatures may also be used to further accelerate curing.

By careful assembly of the components being bonded, the reaction between the two adhesive parts is delayed allowing closed assembly times prior to application of pressure of up to about 30 minutes. This assembly time tolerance has been lacking in any of the previously known honeymoon systems and is particularly necessary when a number of members are being laminated simultaneously.

It is an object of the present invention to provide a method by which two members can be bonded using a two component reactive adhesive by first spreading one component on one member then spreading the second component directly on the first after which the members are pressed together to cause the bond to occur.

It is another object to provide a bonding method using a two component reactive adhesive system that permits multiple layer laminates to be formed in which only one face of each lamina need be coated with the adhesive components.

These and many other objects will become readily apparent upon reading the following detailed description.

DETAILED DESCRIPTION OF THE PREFERRED EMBODIMENTS

For the following experiments an adhesive composition was formed in the following manner. The first part, designated part "A", comprised of 100 parts by weight of an adhesive commercially available as Cascophen® LT-75 room temperature setting phenol-resorcinol glue, 10 parts of Cascoset® FM 260 dry powdered catalyst, and 20 parts of 91% paraformaldehyde. LT-75 is a warm/hot water washable adhesive with relatively low water dilutability and is designated as a wood laminating adhesive. It is available from Borden, Inc., Bellevue, Washington. Cascoset® FM 260 catalyst is available from the same supplier and is believed to be composed of about equal parts of paraformaldehyde and a filler such as wood or walnut shell flour, with a small amount of fumed silica included for viscosity control. Cascophen and Cascoset are registered trademarks of Borden, Inc. The mixed first part is a complete wood adhesive in its own right with a typical pot life of up to 1 hour at 18°–20° C.

The second part of the adhesive, designated part B, was composed of 100 parts of Borden Cascophen® LT-5235 PRF resin and 4 parts of morpholine. LT-5235 is also a wood laminating adhesive with somewhat greater water tolerance than LT-75. This is designed for use with a liquid slurry hardener although no hardener was used in the present instance. Pot life of this mixture is in excess of one month. Inclusion of any methylene group donor-type hardener in the second part of the adhesive is not normally desirable at this time.

The use of the Borden resins and hardener is not intended as an endorsement of these particular products. Equally satisfactory PRF adhesive products are available from a number of other suppliers.

If necessary up to 10 parts of an inert volatile diluent such as isopropyl alcohol may be added to either component for viscosity control. This is normally used with the B component to reduce viscosity in order to permit more uniform spraying over the A component.

It should be noted that Part A of the adhesive contains significantly more hardener than is needed or usually recommended for this particular resin. (Part A should contain sufficient hardener to effect an ultimate thermosetting cure of the resin in both parts A and B.)

Laminated wood structural beams have been in use for many decades. These are formed from solid sawn lumber which is glued together into the desired configuration using a cold setting resin adhesive. In conventional practice the adhesive coated individual laminae are assembled and held in a press for up to several hours while the adhesive bond is formed. Laminated assemblies of wood composite materials, such as flakeboard or particleboard may be formed in similar manner.

Laminated veneer lumber (LVL) is formed from glued together veneer sheets in which the grain is parallel in each lamina. This is laid up to an appropriate thickness and, after bonding, is then ripped into desirable widths so that the dimensions are most usually the same as solid sawn lumber. LVL has the advantage that there are no defects, such as knots, that extend through the entire thickness. Allowable stress ratings are usually higher than those of any except the top lumber grades. Normally water resistant adhesives such as phenol-formaldehyde or phenol-resorcinol-formaldehyde are used in its manufacture. The first named adhesive has the disadvantage of requiring hot pressing. When thicker products are being manufactured the press cycles are extremely long to ensure a full cure of the adhesive on the interior laminae. While the PRF adhesives will cure at room temperature they still require long clamp or press times while the adhesive bond forms.

Conventional honeymoon systems, in which one component of the adhesive is spread on each of the surfaces to be bonded, are not considered suitable for production of LVL. Spreading different components on opposing surfaces is not compatible with present equipment available for LVL manufacture. However, the bonding method of the present invention is highly advantageous for production of LVL. Adhesive applicators can be readily modified to handle the component-on-component system in which both are placed on a single surface. This makes very short press times possible even at room temperature and these can be further shortened if moderate heat is used. The present bonding method also meets another important criterion not heretofore discussed in any depth. While the requirements for open and closed assembly time tolerance are minimal for finger jointing, they are substantial for laminating lumber or veneers. (Open assembly time is the time duration after glue application but before physical layup of the components.) (Closed assembly time is the period after layup has commenced but before full heat and pressure have been applied.) Closed assembly time can be as short as a few minutes or can be as long as a half hour, depending on the particular manufacturing process or adhesive being used. While there are conventional PRF adhesives that meet these criteria, the required press or clamp time at room temperature can be as long as several hours.

The following examples show the use of the present novel method in the manufacture of laminated veneer lumber.

EXAMPLE 1

The adhesive system described earlier was used to prepare simulated laminated veneer lumber by the following procedure. Component B was diluted with 10 parts of isopropyl alcohol to reduce viscosity for spraying. Southern yellow pine veneer 4.2 mm in thickness was cut into sheets about 510×510 mm. The loose side of four sheets was roll coated with about 233 g/m$^2$ of part A of the adhesive. Component B of the adhesive was sprayed directly on top of component A using a similar spread weight. The four sheets were stacked one on the other on top of a fifth sheet which was subcoated. The loose side of the upper sheet was placed on the tight side of the sheet below. Grain direction of all sheets was parallel. A 9 kg weight distributed over the entire area was placed on top of the stack for a five minute period. This was then removed and the stack pressed for 6 minutes at 1725 kPa and a platen temperature of 100° C. The resulting square member about 20 mm in thickness was cut into sample pieces for testing. Internal bond strength of conditioned samples averaged 1480 kPa. A sample of commercially available LVL was tested for comparison and found to have an internal bond strength of only 875 kPa.

It is unexpected that the two components of the adhesive could be placed one on top of the other and still achieve good glue bonds. While the inventors do not wish to be bound by any theory of operation, it appears that a very thin interfacial gel or membrane layer may form almost immediately when the B component is applied over the A component. This prevents further mixing and reaction. However, the interfacial layer is readily ruptured on application of pressure so that the two components can then mix and react fully.

EXAMPLE 2

A laminated veneer billet similar to that described in Example 1 was made up using six plies of 4.2 mm loblolly pine veneer 510×255 mm in surface dimensions and 16–18% moisture content. The adhesive was identical to that of Example 1. Spread weights were also the same as in Example 1. One difference was that the LVL was laid up with the loose side of all the laminae oriented toward the center plane of the piece; i.e., three facing the center from one direction and three from the other. The billet was laid up as each of the laminae were coated. This resulted in closed assembly times ranging from 15 minutes for the first pair of laminae down to 5 minutes for the last pair. The assembly was pressed at 1720 kPa for 7 minutes between platens heated to 100° C.

Eight replicate internal bond tests on the resulting product showed an average strength of 2230 kPa with 100%4 wood failure.

A similar product was made up except that the time before pressing was extended to give a maximum closed assembly time of 40 minutes. On removal from the press it was observed that the oldest of the five glue lines, the one with 40 minutes closed assembly time, had failed to bond well.

EXAMPLE 3

In this example, simulated eight ply LVL was laid up as in Example 2 except that sheet size was 510×510 mm. Press times were 2, 6, and 10 minutes at a platen temperature of 100° C. Pressing pressures were 1725 kPa and 5170 kPa. Closed assembly time was 5 minutes. One set of samples was made under each pressing condition at an extreme 60 minutes closed assembly time but these delaminated during conditioning. After pressing, each assembly had 25 mm trimmed from each edge. They were then ripped parallel to the grain direction into four strips 76 mm wide and two strips 51 mm wide. The 51 mm strips were further cross cut into 51 mm squares for internal bond testing. Samples were then conditioned at 50% R.H. for three weeks at room temperature before testing. Half of the samples were tested as is. The other half were subjected to the pressure wetting and redry sequence used in the AITC 110 delamination test prior to testing. This involves completely submerging the samples under water, applying a vacuum of 510–640 mm of mercury for 30 minutes, then applying a pressure of 520 kPa for 2 hours. Samples are removed and dried approximately 10 hours in a circulating oven at 70° C. and 8–10% R.H. The 51 mm squares were tested for internal bond and the 76×480 mm strips for flexural strength (Modulus of Rupture). Results of the flexure tests are given in Table 1 and internal bond tests in Table 2.

TABLE 1

Flexural Strength (MOR) and Modulus (MOE) for Simulated LVL

| Dry Sample Density, $kg/m^3$ | Time, min | Pressure, kPa | Dry MOR, $kPa \times 10^5$ | AITC MOR, $kPa \times 10^5$ | Dry MOE, $mPa \times 10^7$ | AITC MOE, $mPa \times 10^7$ |
|---|---|---|---|---|---|---|
| 675[a] | 2 | 1,720 | 8.48[acd] | 4.14[abc] | 1.09[a] | 0.80[e] |
| 683[ab] | 2 | 5,170 | 4.96[abe] | 3.30[b] | 0.94[b] | 0.70[f] |
| 684[ab] | 6 | 1,720 | 8.34[cf] | 4.25[b] | 1.09[a] | 0.89[be] |
| 694[b] | 10 | 1,720 | 9.31[df] | 6.85[ac] | 1.07[a] | 0.95[ab] |
| 800[c] | 6 | 5,170 | 11.17[d] | 8.27[cde] | 1.30[c] | 1.05[a] |
| 853[d] | 10 | 5,170 | 14.2[g] | 9.93[d] | 1.46[d] | 1.32[cd] |

Note: n = 4 for density averages and 2 for other values. Values within each column that do not share a common superscript are statistically distinct at a 95% confidence interval.

TABLE 2

Internal Bond Values for Simulated LVL

| Density, $kg/m^3$ | Press Time, min | Pressure, kPa | Dry IB, kPa | AITC IB, kPa |
|---|---|---|---|---|
| 671.2[a] | 2 | 1,720 | 364[ad] | 206[a] |
| 679.2[ab] | 2 | 5,170 | 336[ad] | 400[d] |
| 680.9[ab] | 6 | 1,720 | 758[bef] | 624[ef] |
| 690.5[b] | 10 | 1,720 | 944[bcf] | 429[ade] |
| 796.2[c] | 6 | 5,170 | 1006[bcf] | 834[f] |
| 849.1[d] | 10 | 5,170 | 1117[cfg] | 1,200[g] |

Note: Values not sharing a common superscript are statistically distinct at a 95% confidence interval.

With one exception, flexural strength and modulus increased as the dry sample density increased. Using a 5 minute closed assembly time with press conditions of 100° C. and 1,720 kPa for 6 minutes or greater gave samples having dry internal bond strength values similar to that of a sample of commercially available LVL (measured at 876 kPa).

It is clearly evident that the technique of superposing one component of a two component "honeymoon" adhesive mixture directly on top of the other component prior to assembly of the glue joint can produce a product having properties that are similar to those now commercially available. Other adhesive compositions not exemplified are believed to function similarly in the present process and the invention should be considered as limited only as it is described in the following claims.

We claim:

1. A method of bonding two wood surfaces which comprises:

coating one surface with the first component of a two part extremely rapid curing reactive resin adhesive system, said first component comprising a resorcinol-formaldehyde or phenol-resorcinol-formaldehyde adhesive resin and a hardener comprising an alkylene group donor in a sufficient amount to effect an ultimate thermosetting cure of said adhesive resin;

coating the first component on said one surface with the second component of the two part reactive resin adhesive system so that the two components are in interfacial contact only without significant mixing occurring, said second component comprising a resorcinol-formaldehyde or phenol-resorcinol-formaldehyde adhesive resin containing a sufficient amount of a modifier to induce rapid curing of the two components when mixed, said modifier being a heterocyclic oxygen and nitrogen containing compound of the formula

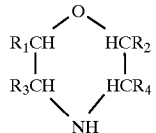

where any of $R_1$ to $R_4$ are hydrogen or $C_{1-C4}$ alkyl; and pressing the adhesive coated wood surface against an uncoated wood surface with sufficient pressure to mix two adhesive components and cause the two components to react and effect a rapid and durable bond.

2. The method of claim 1 in which the modifier in said second portion is morpholine.

3. The method of claim 2 in which the morpholine is present in an amount of 1–10 parts by weight per 100 parts by weight of second adhesive resin.

4. The method of claim 1 in which the wood surfaces being joined are planar surfaces.

5. The method of claim 4 in which the planar wood surfaces being joined are veneer sheets.

6. The method of claim 4 in which the planar wood surfaces being joined are solid sawn wood.

7. The method of claim 4 in which at least one of the wood surfaces is a wood composite material.

8. The method of claim 1 in which the second part of the adhesive is sprayed on the first part in a manner to prevent mixing.

* * * * *